Oct. 21, 1941.     C. C. SCHAEFER ET AL     2,259,588
APPLYING RESISTANCE DEPOSITS TO RADIO VOLUME CONTROL DISKS
Filed June 10, 1939     13 Sheets-Sheet 1
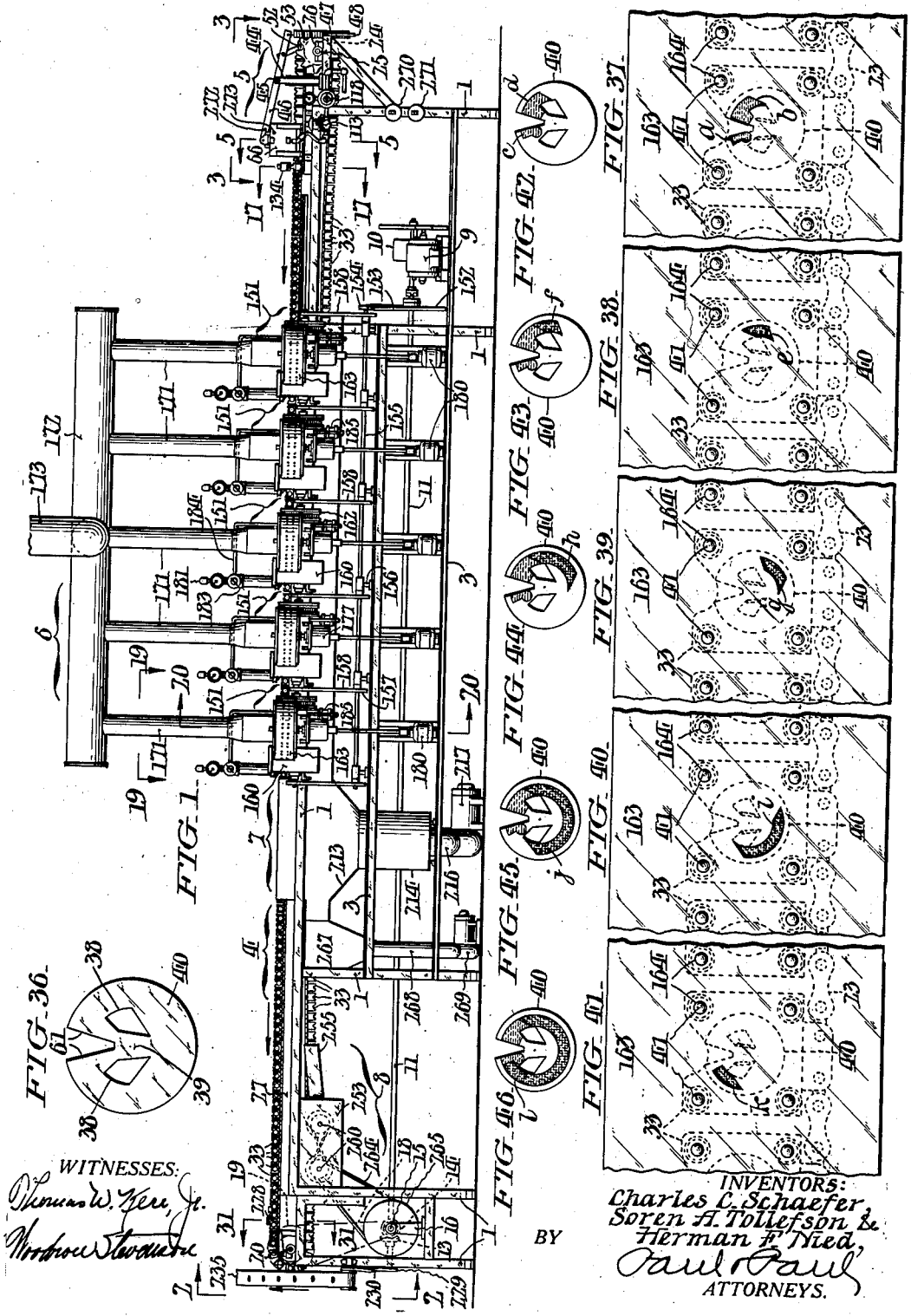
INVENTORS:
Charles C. Schaefer,
Soren A. Tollefson &
Herman F. Nied,
BY
ATTORNEYS.

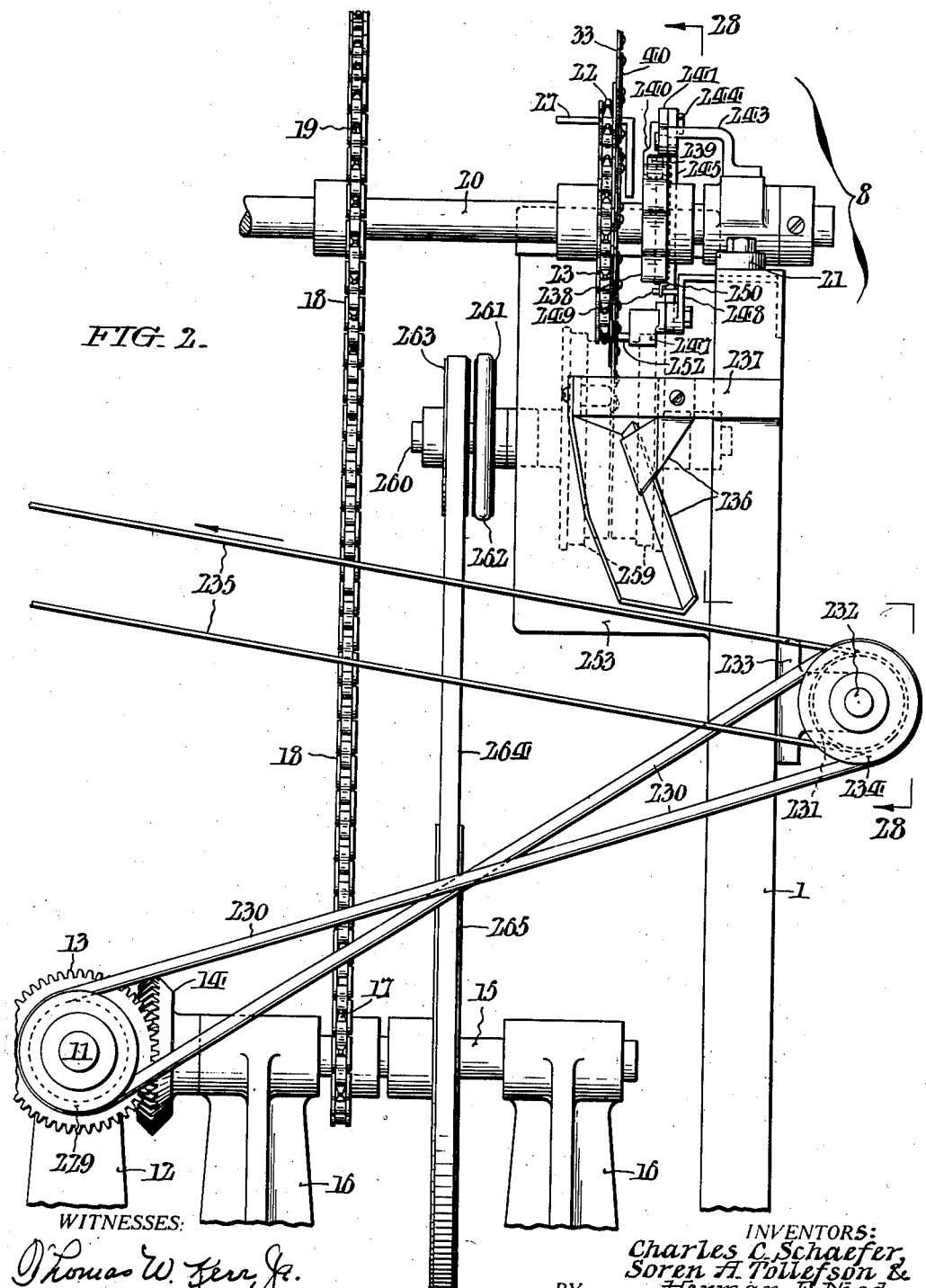

Oct. 21, 1941.  C. C. SCHAEFER ET AL  2,259,588
APPLYING RESISTANCE DEPOSITS TO RADIO VOLUME CONTROL DISKS
Filed June 10, 1939   13 Sheets-Sheet 3
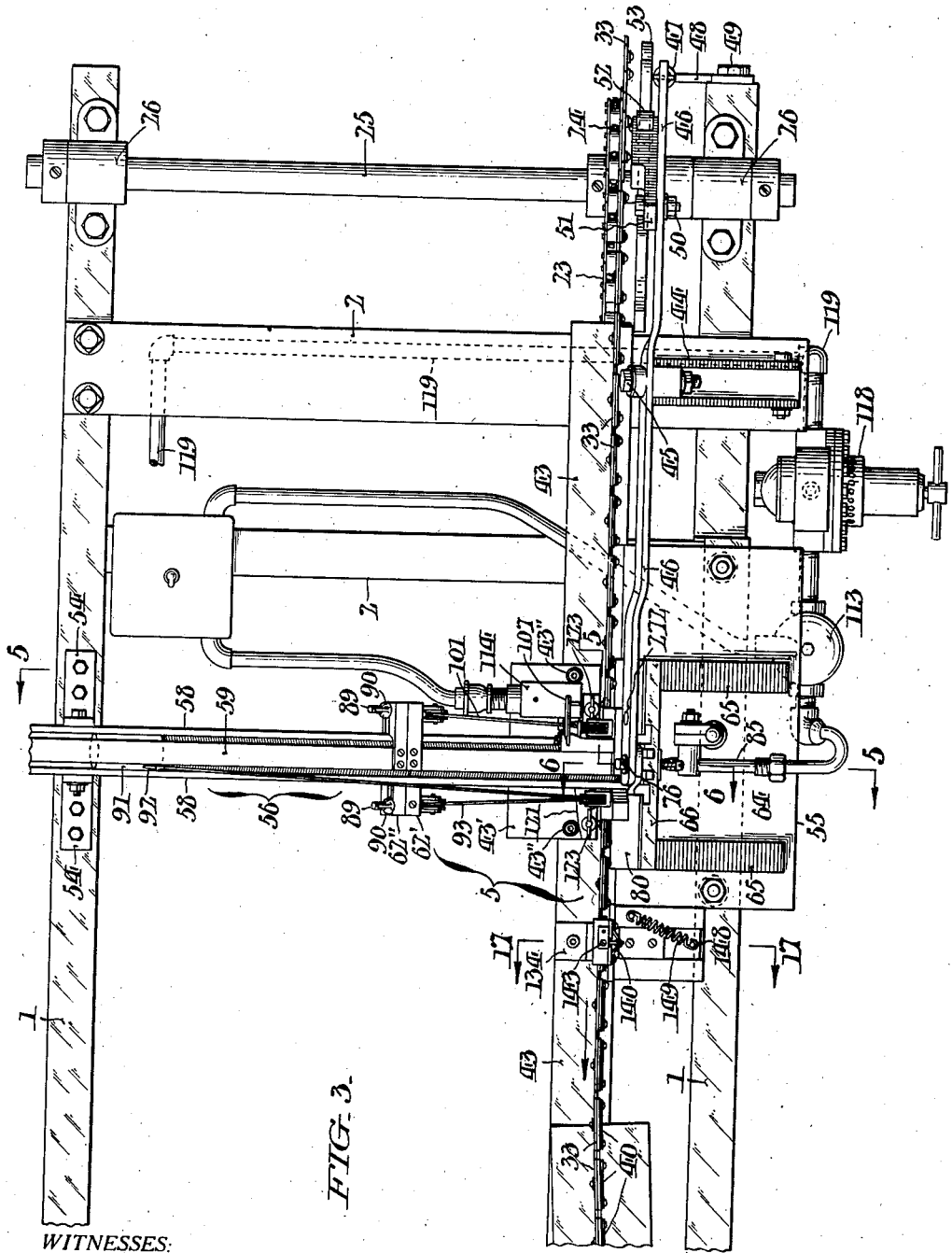

Oct. 21, 1941.   C. C. SCHAEFER ET AL   2,259,588
APPLYING RESISTANCE DEPOSITS TO RADIO VOLUME CONTROL DISKS
Filed June 10, 1939   13 Sheets-Sheet 4
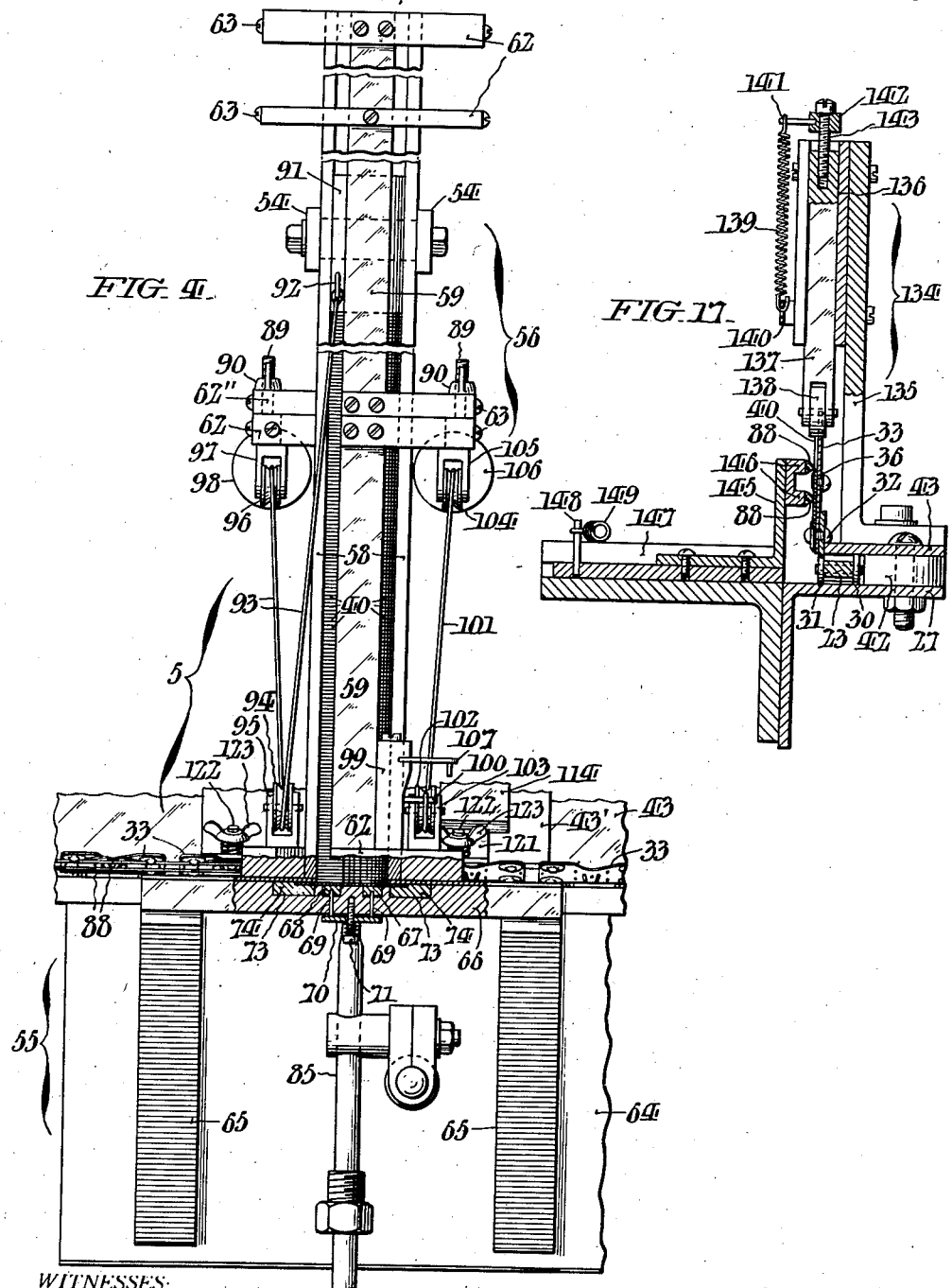
WITNESSES:
INVENTORS:
Charles C. Schaefer,
Soren A. Tollefson, &
Herman F. Died,
BY
ATTORNEYS.

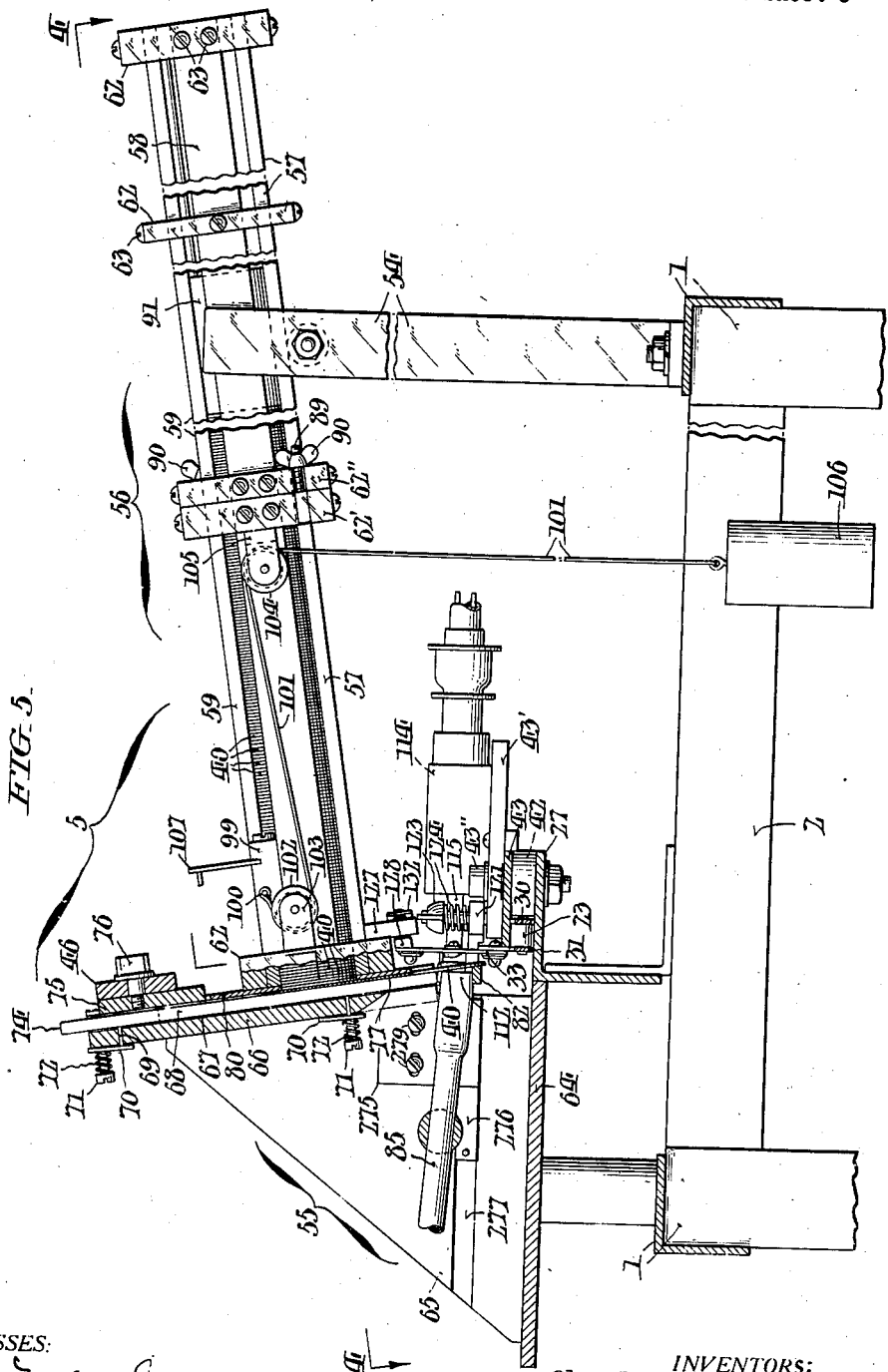

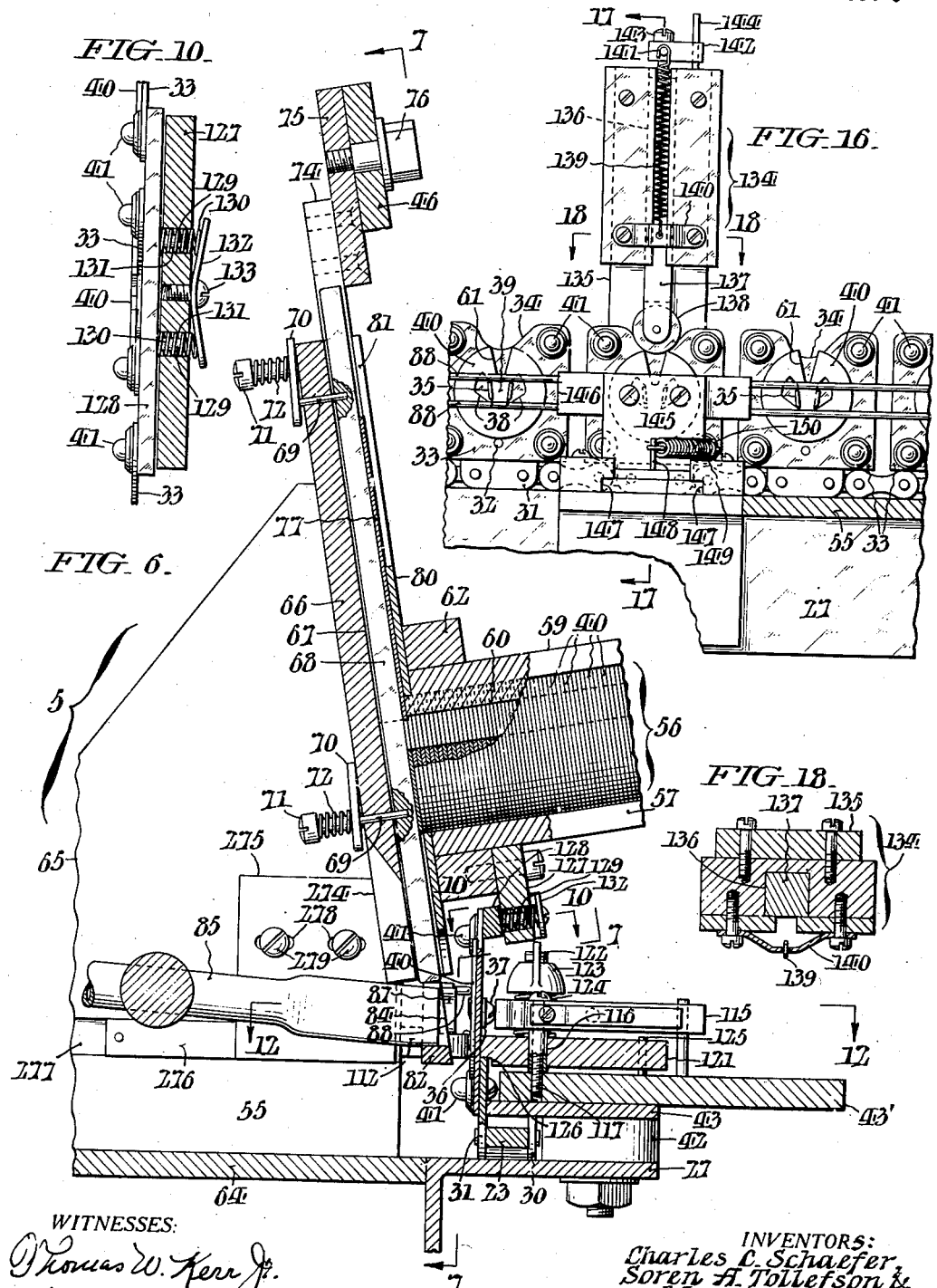

Oct. 21, 1941.   C. C. SCHAEFER ET AL   2,259,588
APPLYING RESISTANCE DEPOSITS TO RADIO VOLUME CONTROL DISKS
Filed June 10, 1939   13 Sheets-Sheet 7
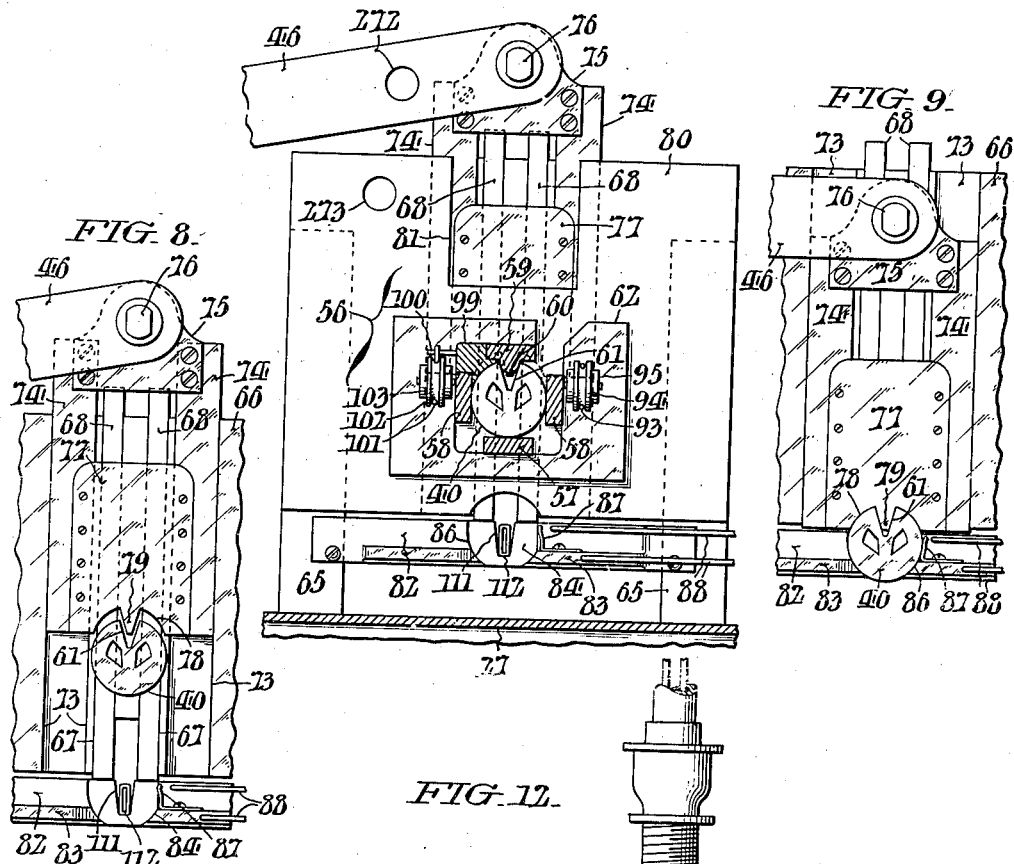
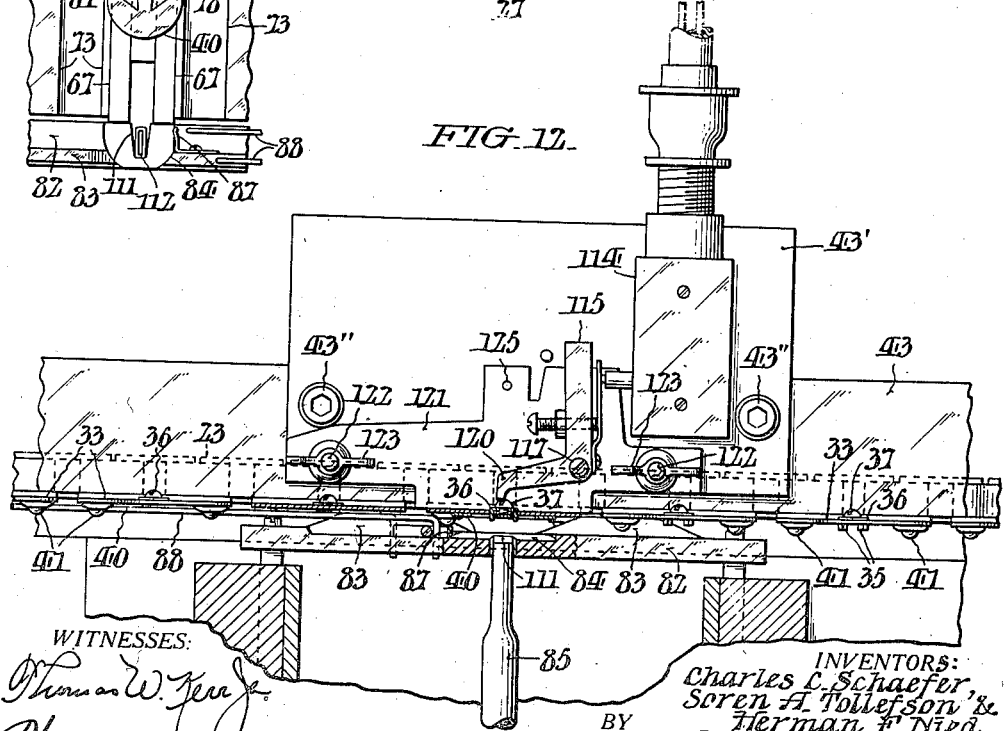
WITNESSES:
INVENTORS:
Charles C. Schaefer,
Soren A. Tollefson, &
Herman F. Nied,
BY
Paul & Paul
ATTORNEYS.

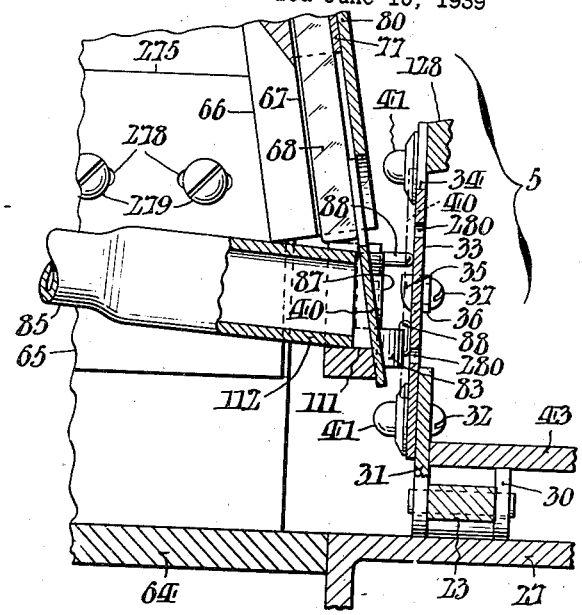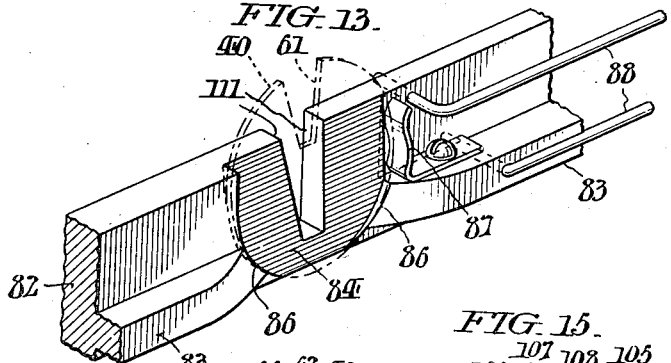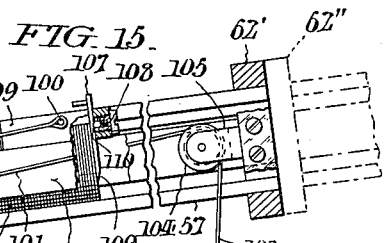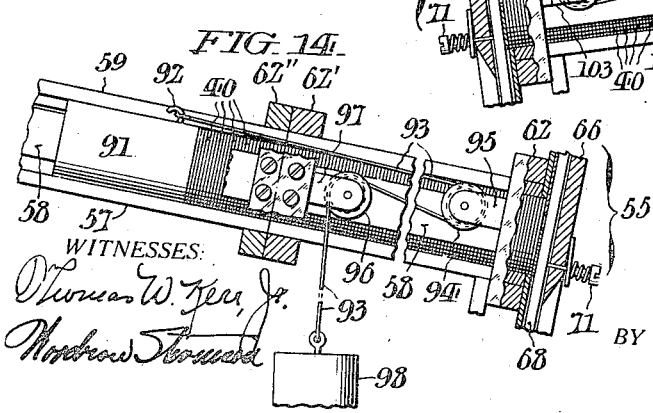

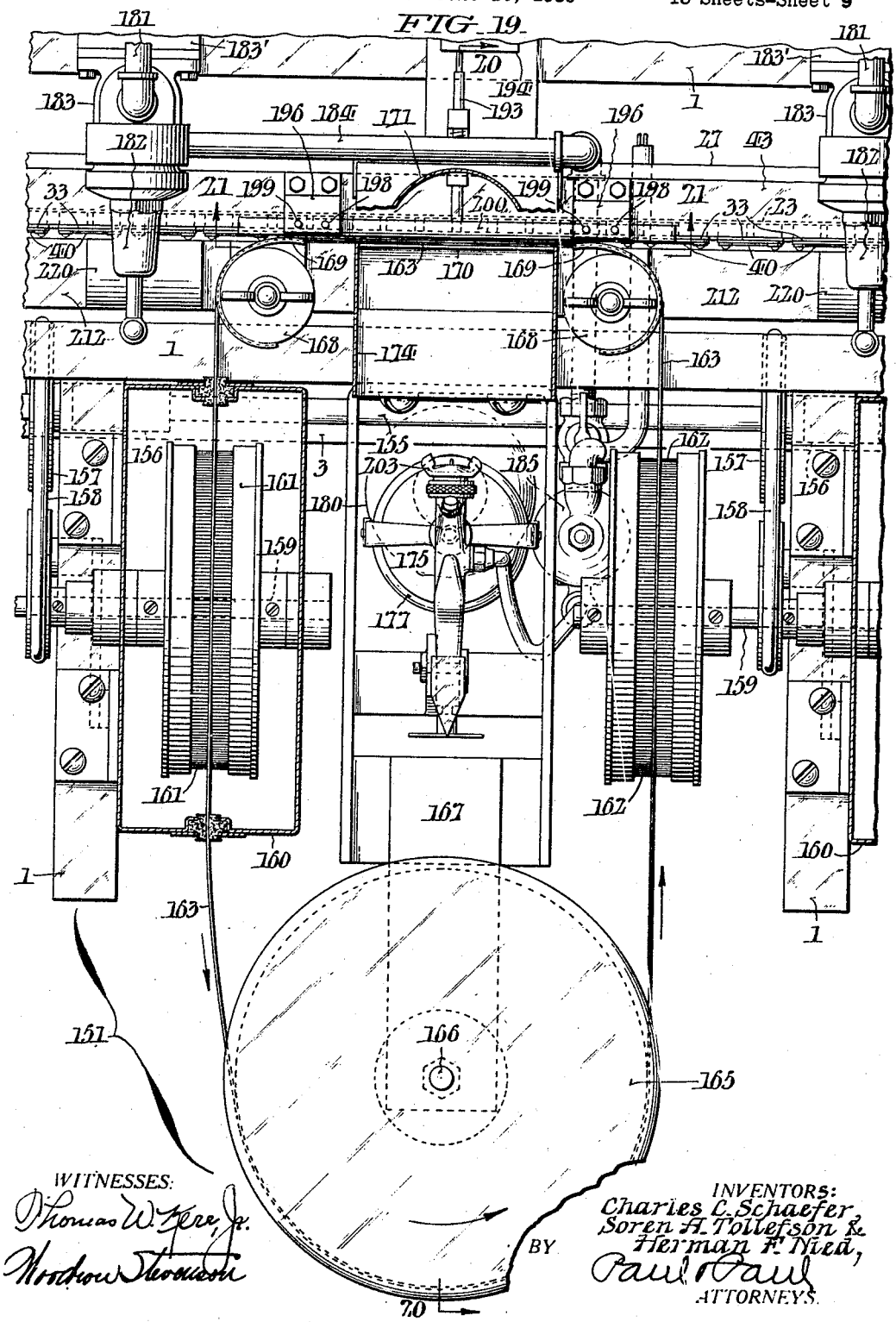

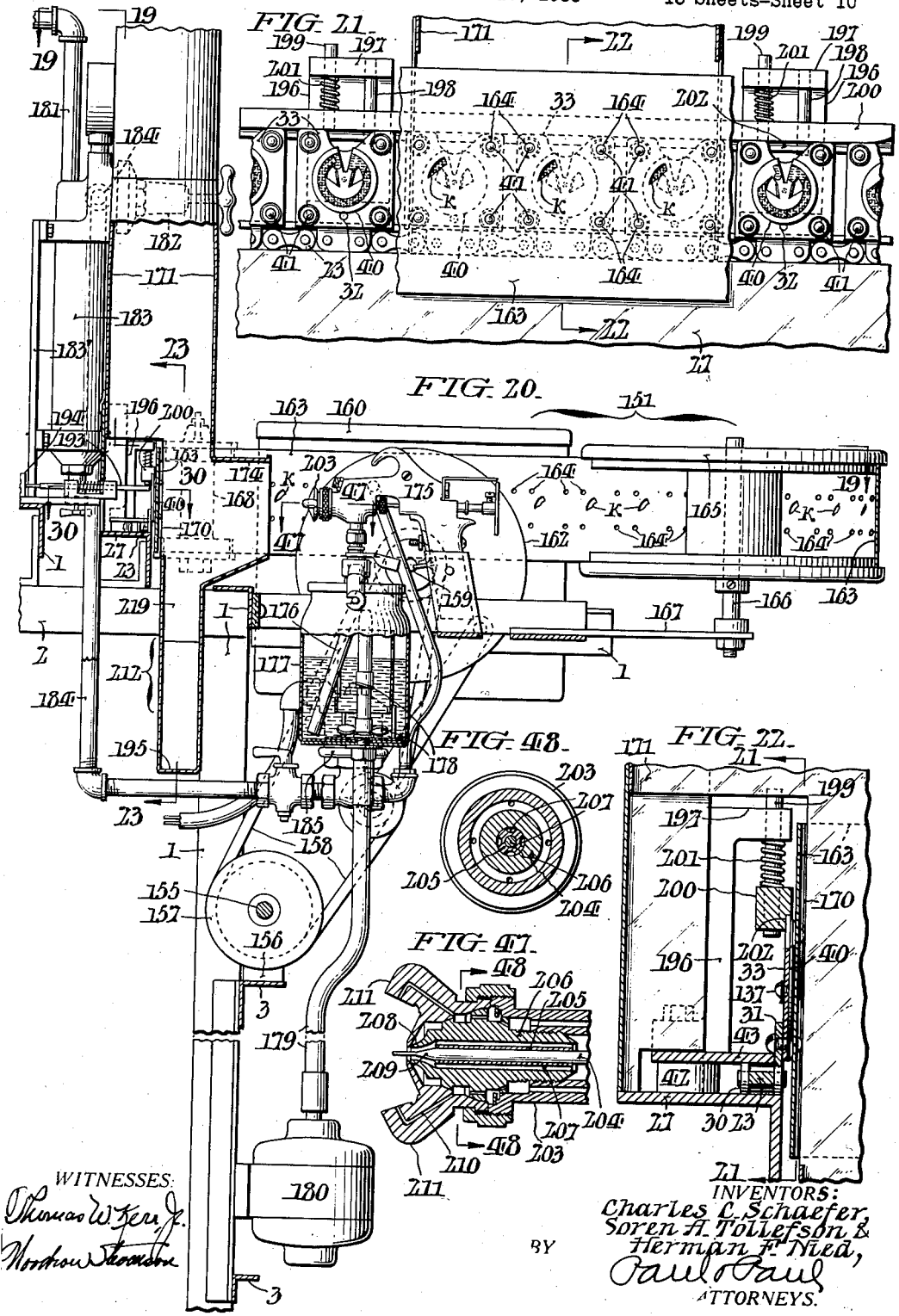

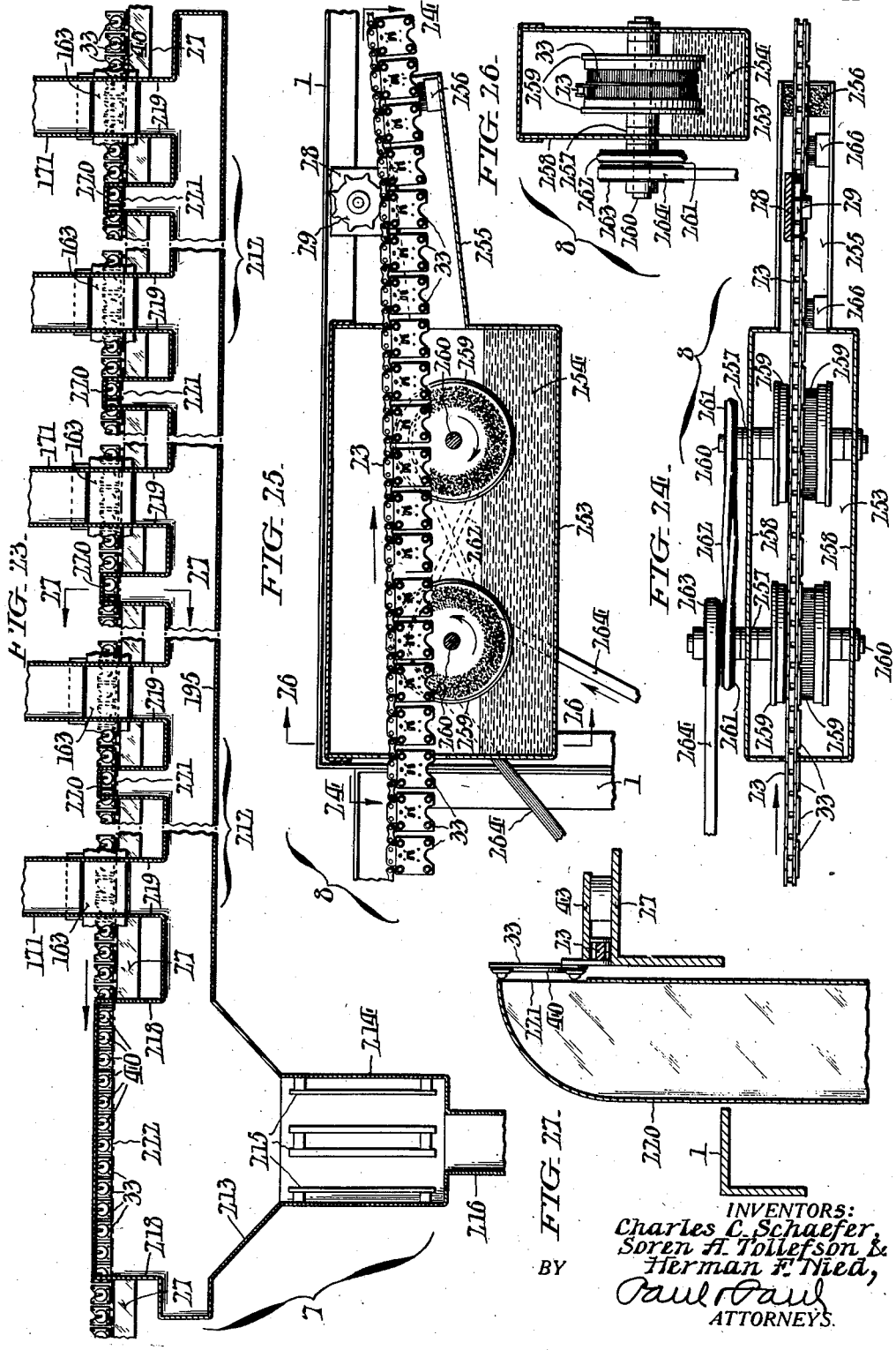

Oct. 21, 1941. C. C. SCHAEFER ET AL 2,259,588
APPLYING RESISTANCE DEPOSITS TO RADIO VOLUME CONTROL DISKS
Filed June 10, 1939 13 Sheets-Sheet 13
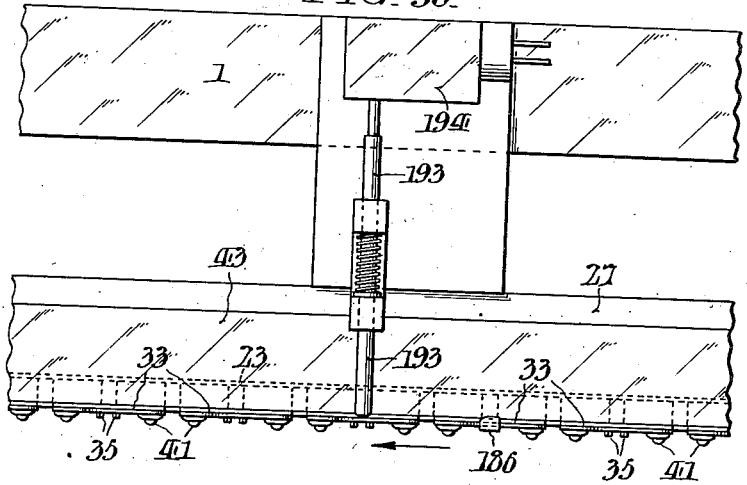
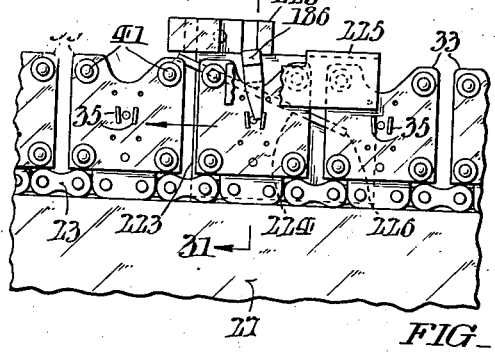
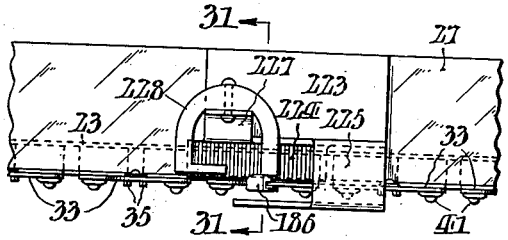
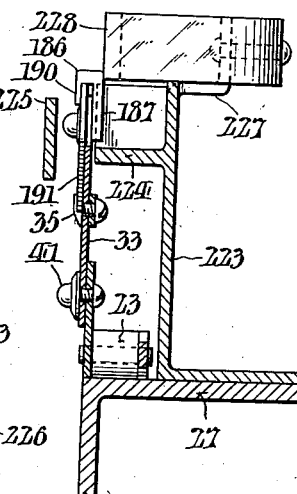
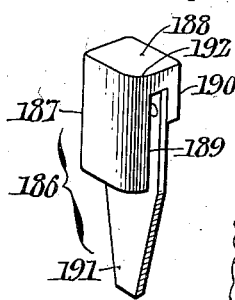
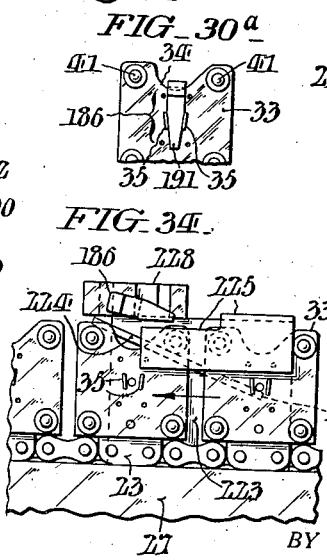
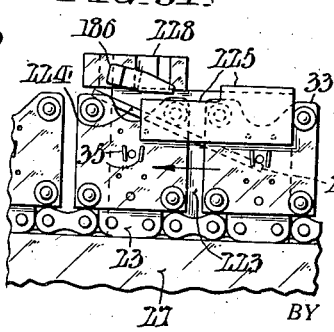
INVENTORS:
Charles C. Schaefer,
Soren A. Tollefson, &
Herman F. Nied,
BY Paul & Paul
ATTORNEYS.

Patented Oct. 21, 1941

2,259,588

UNITED STATES PATENT OFFICE 2,259,588

APPLYING RESISTANCE DEPOSITS TO RADIO VOLUME CONTROL DISKS

Charles C. Schaefer and Soren A. Tollefson, Oaklyn, and Herman F. Nied, Camden, N. J.

Application June 10, 1939, Serial No. 278,574

28 Claims. (Cl. 91—55)

This invention relates to the application of resistance deposits to Bakelite or analogous material disks and, more particularly, to the type of disk employed as a substitute for wire windings in rheostats of radio volume control units, and differentially coated with silver and carbon to vary the ohms resistance capacity. Heretofore disks of the kind referred to have been manually coated by the aid of a suitable spray gun with consequent lack of uniformity in the degree of intensity and resultant heavy wastage both of disk material as well as the resistance deposits.

The primary aim of this invention is to positively eliminate the noted wastages in addition to producing disks coated, as required, with resistance deposit of accurately determinable intensity and uniform area.

Another object is to provide an automatic mechanism for applying resistance deposits of consistent fluency irrespective of the required density or thickness so that the ohms resistance can be accurately gauged, and said deposit or deposits applied without intervening interference when changing the per cent of total resistance in radio volume control units.

A further object is the provision of a machine adapted to automatically apply differential areas of resistance deposit to rheostat disks in consecutive order and definite relation with preassurance that any multiplicity of such disks can be successively produced without potential resistance differentiation.

A still further object of this invention is to provide a machine as indicated in the preceding paragraph equipped with pressure influenced deposit-effecting nozzles adapted to eject an annular spray of the resistance deposit without the slightest deviation from concentricity and incidental to emission thereof to compact said spray by opposing air jets to predetermined elongate configuration.

Another object of this invention is to provide a machine for applying resistance deposits intermittently to disks of the typified character as said disks are transported by a continuously moving conveyor, and to concurrently feed-in the successive disks without stoppage of the said conveyor.

A further object is to provide a machine of the typified character including means functional to simultaneously adhere the resistance deposit to the disk as applied, to the avoidance of any "spread," and to gradually dry the same until the consecutive disks are transferred from the machine for subsequent baking.

Still another object is to provide a machine as above indicated including a continuous conveyor and means operative to effectively clean the conveyor disk carriers and deposit controlling masks after removal of the treated disks before reaching the entrant end of the machine.

Other objects of a tributory character in addition to ancillary advantages achieved by this invention will be apparent from, or specifically noted in, the following description; and it may be said to essentially comprise the elements and combinations of the same, features of construction, and arrangements of parts that are typically shown in the preferred embodiment illustrated by the accompanying sheets of drawings, and the scope of application whereof is more particularly defined in the concluding claims.

In the drawings:

Fig. 1 is a side elevation of a machine for applying resistance deposits to rheostat disks adapted for use in radio volume control units and embodying the constructive features of this invention.

Fig. 2 is an end elevation within the limits of the arrows 2—2 at the left-hand or discharge end of the machine shown in the preceding illustration, but drawn to a larger scale for clarity.

Fig. 3 is a top plan view within the confines of the plane indicating arrows 3—3 at the right-hand or feed-in end of Fig. 1, also drawn to a larger scale for clearer illustration of important details.

Fig. 4 is a plan section of the disk magazine and mechanism for feeding the successive disks to the conveyor means, said section being taken approximately on the staggered plane 4—4 of Fig. 5.

Fig. 5 is a part section and part elevation on the plane 5—5 in Figs. 1 and 3.

Fig. 6 is a fragmentary sectional elevation, within the limits of the arrows 6—6 in Fig. 3, or through the feed portion of the disk magazine, drawn to a larger scale than in Fig. 5, to better illustrate how successive disks are initially removed from the magazine for transfer into registration with the conveyor carrier elements.

Fig. 7 is a fragmentary elevation and part sectional view on the staggered-plane 7—7 of Fig. 6, but drawn to a smaller scale.

Figs. 8 and 9 are fragmentary views similar to Fig. 7, but showing different positions of the disk ejector member in moving the consecutive disks from the magazine into position for application to the conveyor carrier elements.

Fig. 10 (sheet 6) is a fragmentary section, on the plane 10—10 of Fig. 6, hereinafter fully explained.

Fig. 11 (sheet 8) is a fragmentary sectional view of the lower central portion of Fig. 6, on a larger scale, showing a disk in position ready for projection against a conveyor chain carrier element.

Fig. 12 (sheet 7) is a plan section, taken approximately as indicated by the arrows 12—12 in Fig. 6, and showing suitable pneumatic devices for blowing the successive disks from the transfer means onto an opposing carrier element with a disk in position on said carrier element.

Fig. 13 (sheet 8) is a detail perspective view of a retainer means effective for preventing the disks from dropping away from the feed mechanism transfer means.

Fig. 14 is a fragmentary sectional view through the magazine disk delivering end.

Fig. 15 is a similar view to the preceding as seen from the reverse side thereof and with certain movable parts in a different position.

Fig. 16 (sheet 6) is a fragmentary elevation as viewed from the left-hand and looking towards the right of Fig. 17.

Figure 28:
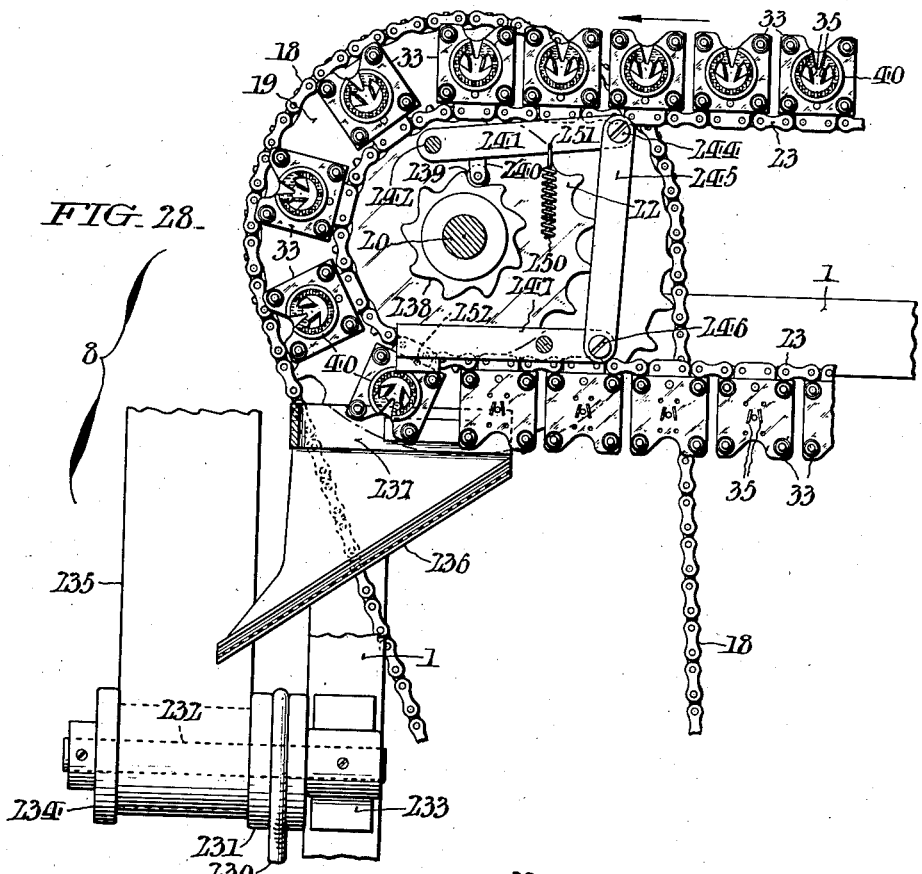

Fig. 17 (sheet 4) is a vertical section on the arrowed planes 17—17 in Figs. 1, 3 and 16.

Fig. 18 (sheet 6) is a section on the plane 18—18 of Fig. 16.

Fig. 19 (sheet 9) is a plan view of one of the spraying units, said view being taken approximately on the planes designated 19—19 in Figs. 1 and 20.

Fig. 20 (sheet 10) is a part elevation and part sectional view on the planes 20—20 in Figs. 1 and 19.

Fig. 21 is a fragmentary elevation taken within the limits of the plane indicating arrows 21—21 of Figs. 19 and 22.

Fig. 22 is a vertical section on the plane 22—22 in Fig. 21.

Fig. 23 (sheet 11) is a sectional elevation through the drying means, said section being taken approximately as indicated by the arrows 23—23 in Fig. 20.

Fig. 24 is a plan section through the conveyor cleaning means proximate the disk discharge end of the machine, said section being taken approximately on the plane 24—24 of Fig. 25.

Fig. 25 is a longitudinal section on a vertical plane through the center of the preceding figure.

Fig. 26 is a lateral section on the plane 26—26 of Fig. 25.

Fig. 27 is a cross-section taken as indicated by the arrows 27—27 in Fig. 23.

Fig. 28 (sheet 12) is a fragmentary elevation of the mechanism operative to remove the disks from the conveyor carrier elements at the discharge end of the machine, said elevation being taken substantially as indicated by the staggered plane 28—28 in Fig. 2.

Figure 29:
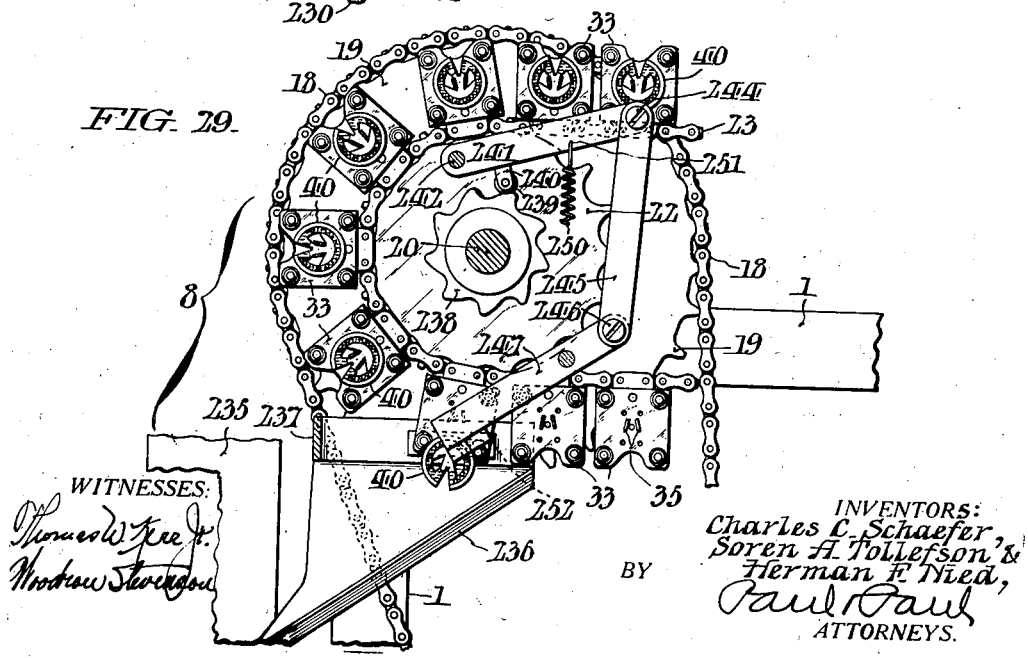

Fig. 29 is a substantially similar view to the preceding with the remover means in full active position.

Fig. 30 (sheet 13) is a fragmentary plan view of a pressure control hereinafter fully described, said view being taken on the plane 30—30 in Fig. 20.

Fig. 30a is a detail hereinafter specifically explained.

Fig. 31 is a vertical section on the plane 31—31 in Figs. 1, 32 and 33.

Fig. 32 is a fragmentary plan view of a horseshoe magnet for removing a trip device, from the selected carrier element, and also serving to actuate the pressure control means of Fig. 30.

Fig. 33 is an elevation as viewed from below the preceding figure.

Fig. 34 is a fragmentary view in part corresponding with Fig. 33, but showing the trip device released from the conveyor carrier element and held by the horse-shoe magnet.

Fig. 35 is a perspective view of the trip device.

Fig. 36 (sheet 1) is a face view of one of the rheostat disks before application thereto of any resistance deposits.

Figs. 37—41, inclusive, are fragmentary mask views depicting successive operative stages in producing a disk with sectional resistance deposits of varying area and density in accordance with this invention.

Figs. 42—46 are paralleling views illustrative of the consecutive deposit applications effected on the disks incident to the operative stages shown in Figs. 37—41; and, Figs. 47 and 48 (sheet 10) are nozzle details hereinafter fully described.

In the illustrated embodiment of this invention as preferably adapted to the application of resistance deposits of predetermined areas and density to rheostat disks for radio volume control units, the machine comprises parallel framework supports 1, of appropriate formation, which are rigidly connected by cross ties 2 and longitudinal braces 3. Suitably sustained by the supports 1, as later on further amplified, is a continuously operable conveyor 4; the magazine and feed mechanism comprehensively designated 5; a battery of mask and deposit applicator means 6; a drying system 7; and a disk releasing and discharging mechanism with associated conveyor cleaning means generally marked 8: all of said parts being operatively coordinated for automatic actuation in timed sequence.

Conveniently mounted between the supports 1 is an electric motor 9 and speed-transmission 10, operatively coupled to the main drive shaft 11, journaled in suitable bearings 12 at intervals of the framework supports 1, said shaft having at its end remote from the motor 9 a bevel gear 13 in mesh with a complemental gear 14, fixed on a countershaft 15 rotative in pedestal bearings 16. Fast on the countershaft 15 is a sprocket 17 about which passes a chain drive 18 coactive with a tooth-drive 19 rigid on a transverse shaft 20, journaled in bearings 21 mounted on the framework supports 1, at the "discharge" end of the machine. This shaft 20 has secured thereon a second sprocket drive 22 about which is trained the endless conveyor-chain 23, of special type, and which is similarly coactive with a sprocket 24 keyed to a freely rotative transverse shaft 25, journaled in bearings 26, at the "feed" end of the machine, or right hand of Figs. 1 and 3. In its active flight the conveyor-chain 23 traverses or rides on a track 27, provided for the purpose along the top edges of one of the supports 1; and, during the return flight it is sustained, at intervals, by angle brackets 28, Figs. 24 and 25, each having an associated aligning sprocket 29, only one such means being indicated in said figures to avoid confusive illustration. The conveyor-chain 23, it is to be observed, is of special construction and comprises conventional spaced links 30 with alternating rectangular plate or somewhat T-section components 31 along one side thereof, as best appreciated from Figs. 6, 11, 17, 28 and 29, said components 31 being of greater depth than the width of the links 30, as best shown in Figs. 6, 11, 21 and 22. To each component 31 is affixed, as by a set-screw 32, a rectangular carrier 33 having an undulate recess 34 in the upper part, and outset opposedly-inclined lugs 35, preferably constituted by the flanges of channel-section elements 36, best seen in Figs. 11 and 12, clamped thereto by set-screws 37, with said flanges engaged through complemental slots in the carrier 33, so as to ensure against relative movement. These flanges or lugs 35 serve to engage through apertures 38 and grip the tapering central part 39 of the rheostat discs 40 to support the latter during application thereto of the resistance deposits; and each said carrier 33 is fitted with spaced studs 41, near the angular corners and hereinafter referred to as "mask" progressing pins.

To prevent the active flight of the conveyor 4 from lifting as well as to positively ensure its aligned progression along the track 27, in respect to successive mechanisms involved in the machine, as well as actuated by the conveyor-chain 23, said track is fitted at regular intervals of its length with appropriate spacers 42, and a member 43 paralleling such track. This member 43, in conjunction with the track 27 jointly afford smooth guidance for the conveyor links 30 with the T-section components riding along the edge of member 43, as clearly understandable from Figs. 5, 6 and 11, more particularly.

Mounted on one of the framework-supports 1, proximate the feed end of the machine, is a rigid fulcrum bracket 44 having pivoted thereto at 45 an actuator-lever 46 to the outer end of which is connected one extremity of a recoil spring 47 having its other end coupled to an anchor member 48, secured at 49 to the end of the support aforesaid. Fixed to the actuator-lever 46, with capacity for adjustment as by appropriate clamp means 50 is a pawling element 51 having an antifriction roller 52 at its free end, in turn coactive with a tooth-cam 53 fast on the transverse or driven shaft 25, whereby the lever 46 is rocked on its pivot 45 in opposition to the spring 47, for a purpose later explained. Spanning the framework supports 1 and attached thereto by spaced brackets 54 and a foot structure 55, Figs. 3, 4, 5 and 6, is the magazine and feed mechanism 5. This mechanism comprises an inclined chute 56 including a bottom bar 57, Fig. 7, side bars 58 and a top bar 59 having an inwardly-directed rib 60 for coaction with the V-notch 61 of the rheostat disks 40. The bars 57, 58 and 59 are secured in relative assembly, to afford smooth guidance for a column of rheostat disks 40, by connecting collars 62 with screws 63, in an obvious manner, to ensure accurate parallelism and alignment; while the lower end collar 62 preferably forms part of the foot structure 55, as best understood from Figs. 5 and 6. The foot structure 55 embodies a base 64 with spaced uprights 65 and a relatively-adjustable spanning wall 66, Figs. 4–6, said wall being disposed at right angles to the longitudinal inclination of the chute 56 and having spaced grooves 67 therein for wear bars 68 which are influenced towards the discharge end of said chute by socketed pins 69 under the action of pushers 70 afforded guidance by adjustable screws 71, and having springs 72 in compression intermediate the head portions of said screws and the outer face of the pushers 70. It is to be here noted that the socketed pins 69, carried by the wear bars 68, are of such a length to normally project beyond the outer surface of the connecting wall 67 so as to hold the pushers 70 inclined relative to said surface, as clearly shown in Figs. 5 and 6. In addition to the grooves 67 in the foot piece spanning wall 66, the latter has flanking other grooves 73 affording guidance for slide bars 74 connected together at the upper ends by a tie-piece 75, and to which the inner end of the actuator lever 46 is pivotally connected by a shouldered stud 76. Also bridging and rigidly secured to the slide bars 74 is an ejector-plate 77 of appropriate thickness to remove the successive rheostat disks 40 from the chute 56, as hereinafter set forth; while it is to be particularly observed the ejector-plate 77 is provided with an arcual cut-out 78 and central tongue 79 adapted to jointly coact with the rheostat disk circumferential edge and V-notch 61 respectively, Fig. 8, to effectively prevent displacement or turning movement of the disks 4 during removal from the chute 56; and 80 is a face plate secured to the spaced uprights 65 for retaining the wear bars 68 and slide bars 74 in their respective grooves 67 and 73, said face plate having a cut-out 81, Figs. 5–7, accommodating reciprocative clearance for the slide bars 74 and tie-piece 75.

Arranged below the ejector plate 77 and associated parts is a disk receiver and temporary holder conveniently in the form of a bar 82 having a longitudinal rib 83 and an inclined interruption or recess 84 in confronting juxtaposition to an air nozzle 85, as well as in special relation to the successive conveyor chain disc carriers 33, as later on again referred to. As will be best understood from Figs. 11–13, inclusive, the interruption 84 defines sectoral edges 86, on which the lower circumferential edge of each consecutive disk 40 released by the ejector plate 77 temporarily rests and is so held by a suitably contoured or undulate spring 87. In addition the bar 82 is also provided with paralleling flexible wires 88 functional to hold the disks 40 against the carrier 33 until effectively held thereagainst by the inclined lugs 35 hereinbefore referred to.

In order that the inclined chute 56 may be kept continuously replenished with disks 40, said chute is preferably made in two sections which are connected together by screws 89, with wing nuts 90 respectively secured-in and coactive-with intermediate collars 62′, 62″, Figs. 3–5, with the one section being removable by releasing said nuts 90 and lifting from support by the spaced brackets 54, for refilling with disks 40 when emptied, and replacement in an obvious manner. Slidably fitting the chute 56 is a feed block or follower 91 having a radially projecting hook 92, at one side of the chute 56, to which is attached one end of a flexible cord or the like 93, in turn trained around a freely rotative sheave 94 in a bearing 95 carried by the foot structure 55, and a second sheave 96 in a bearing 97 carried by the collar 62′ and having a weight 98 at its free end. The follower 91 serves to maintain the column of disks 40 compacted towards the lower end of the chute 56 in contact with the wear bars 68.

In order that the disks 40 may be constantly held under forward influence towards the wear bars 68 when the upper chute section is removed, as aforesaid, for refilling, there is provided a second "pull-influenced" means at the opposite side of the chute 56 and comprising a block 99 of suitable cross-section to movably coact with one of the chute side bars 58 and the top bar 59 as clearly shown in Fig. 7. This block 99 normally occupies the position shown in Fig. 5, or in abutment with the foot structure 55, and it is provided with a lateral hook or pin 100 to which one end of a flexible cord or the like 101 is attached, while said cord is trained around a sheave 102 carried by a bearing 103 on the foot structure 55 and a second sheave 104 in a bearing 105 on the collar 62' with a weight 106 at its free end. In addition the block 99 is provided with a push-in slide 107 under control of a spring-influenced snap device 108, best shown in Fig. 15. Now it will be readily understood that when the supply of disks 40 passes below the collar 62' the operator slides the block 99 upwards, as viewed in Figs. 5 and 15, for example, and pushes-in the slide 107 between the uppermost disk 40 and the bottom face of the follower 91 in opposition to the snap device 108. From Fig. 15 it will be seen the inner end of the push-in slide 107 is chamfered down at 109 to aid its free insertion, as well as having a recess 110 for coaction with the snap device 108 to hold said slide in the active position for feeding the disks 40 forward under influence of the weight 106. Incident to the operation just described, the operator releases the cord 93 from the follower hook 92, whereupon the chute upper section, and follower 91, can be removed by disconnecting the wing nuts 90 from the screws 89 and the said section refilled with disks 40 and the follower 91 replaced and attached to the cord 93 after the upper section is reconnected by the wing nuts 90 and screws 89. Obviously, as soon as the disk replenishment is effected, as just explained the slide 107 is retracted when the weight 106 automatically retracts the block 99 to its normal position in abutment with the foot structure 55, and it will be appreciated that by the means described feeding forward of the disks 40 continues uninterruptedly as long as the machine is in operation.

In order to transfer each successively released disk 40 from the inclined recess 84, let it be first remarked the latter is provided with a cut-out 111 into which the laterally collapsed end 112 of the nozzle 85 projects, Figs. 11 and 12, and that such transfer is effected by intermittent blasts of pressure air emitted by said nozzle. The nozzle 85 is under control of a magnetic valve 113, in turn actuated by a suitable switch 114, intermittently operated by a spring-influenced angle member 115 fulcrumed by a sleeve 116, to a pillar 117, secured in a table plate 43' attached to the member 43 by clamp-screws 43", see Figs. 6 and 12 to best advantage. Pressure air is supplied to the valve 113 through a conventional regulator 118 by a conduit 119 from any convenient source of supply, not shown; while the magnetic switch 114 is actuated to open and close the valve 113 by a trip portion 120 of the member 115 engaging the head of the channel-section set screws 37, hereinbefore referred to, as the conveyor chain 23 progresses.

At this juncture, note is to be had that, in order to keep the conveyor chain from displacement incident to machine vibration or other causes, use is made of a floating plate 121 afforded vertical guidance by the sleeve 116, and spaced pins 122 having their upper ends screw threaded for engagement by wing nuts 123 with interposed springs 124, and another guide pin or pins 125 functional to prevent planar inclination of floating plate 121, said plate having an undercut groove 126 for coaction with the top edge of the special chain links or T-shaped components 31. In addition to the means just described and in order to prevent deflection of the carrier members 33, under influence of the pressure air when transferring released disks 40 to said members, a buffer device is provided, said device comprising a bar 127 which is rigidly fixed to the foot structure abutting collar 62 with projection therebelow. Supported by the bar 127 is a buffer member 128 having spaced studs 129 with encircling coil springs 130, housed in holes 131 through said bar, with the opposed ends of the springs 130 engaging a flat adjuster member 132 held in place on the bar 127 by a screw 133. The member 132 is variably flexed to hold the buffer member 128 in such a position that the conveyor carrier members 33 are maintained vertical during successive impacts of the air blasts emitted by the nozzle 85.

In order that the successive disks 40 applied to the consecutive carriers 33 may be firmly retained in position for deposit application and to prevent any rotary movement thereof relative to the inclined lugs 35, use is made of a wedging device seen to best advantage in Figs. 16 and 17, and comprehensively designated 134. This device 134 comprises a vertical bracket 135, secured on the member 43 in proximity to the chute 56, said bracket having guide races 136 in which a slide 137 is movable, while the slide 137 has a freely rotative roller 138 in its lower part, adapted to ride along the top edge of the carrier members 33. This slide 137 is downwardly influenced by a spring 139 anchored at one end to an apertured strap 140 secured across the races 136; and at the other end coupled at 141 to a block 142, vertically adjustable by a screw 143, threadedly engaged in the upper end of the slide 137, and said block 142 is prevented from rotary movement by a guide pin 144 in a clearly apparent manner, while it will be observed the block 142 also serves as a downward movement limiting stop for said slide 137. Now it will be readily seen that as each consecutive carrier 33 upper edge engages the roller 138 and progresses thereunder, said roller will follow the contour of the undulate recess 34 in the top edge of the carrier 33 and engaging the upper circumferential edges of the disk 40, flanking the V-notch 61 therein, will impart a diametric thrust thereto and force the tapering central part 39 into gripping engagement between the inclined lugs 35, as clearly understandable by comparison of the right and left-hand positional showings in Fig. 16 of said disks. In combination with the wedging device 134 there is provided a laterally effective pusher or holder 145 for coaction with the wires 88 carried by the bar 82, said holder 145 preferably being in the form of an angle-section slide with suitable projections 146 for coaction with the wires 88, and it is guided in appropriate stationary groove means 147. The holder 145 has an anchorage 148 for one end of a retractile spring 149, the other end whereof is attached to a second anchorage 150 projecting from one of the groove means 147, thus it will be seen the holder 145 is constantly influenced towards the wedging device 134 whereby the conveyor chain special components 31 and attached carriers 33 are held vertical during operation of the disk wedging device 134.

Turning now to the mask and resistance deposit applicator means hereinbefore generally designated 6, inasmuch as the same comprises a series of operatively coordinated corresponding units 151, Fig. 1, the following description will be confined to one unit as more fully shown in Figs. 19–21, in order to dispense with unnecessary repetitive matter, while the relative functions will be later on pointed out. Referring to Fig. 1, it will be observed the units 151 are operated from the main drive shaft 11 through the medium of a groove-pulley 152 and V-belt 153 to a similar pulley 154 on a countershaft 155 journaled in bearings 156 along one of the framework longitudinals 3. Fast on the countershaft 155 are pulleys 157 with endless drives 158 respectively coordinated to short shafts 159 journaled in boxes 160, sustained by the machine framework supports 1, said shafts having pairs of brushes 161, 162 fast thereon, for coaction with the inner and outer surfaces of an endless "mask" 163. The mask 163 is provided with paralleling apertures 164 for engagement with the conveyor chain "mask" progressing pins 41 and whereby said mask 163 is simultaneously advanced with the conveyor chain 23. The mask 163 is trained about a freely-rotative spool 165 on a stationary vertical shaft 166, carried by a bearing member 167 from the adjacent support 1, as well as stationary spools 168, with arcual guards 169, adapted to guide said mask in close proximity to the conveyor chain 23, and an opening 170 from a vertical exhaust conduit 171 connecting into a manifold 172 having a discharge outlet 173 to atmosphere, or where desired. Opposing the opening 170 is a funnel-structure 174 in front of which an appropriate spray gun 175 is mounted, said gun being in communication by a pipe 176 with a receptacle 177 containing solvent resistance deposit, such as carbon or silver, for application to the rheostat disks 40, as later explained. Each receptacle 177 is provided with an agitator 178 driven by a flexible shaft 179, from an associated electric motor 180. Pressure air is supplied from any convenient source by way of a conduit 181, having a manual shut-off valve 182, into a conventional pressure gauge 183, supported by a bracket 183' from the main frame, and conduit 184 to a magnetic valve 185, and from thence to the spray gun 175. The magnetic valve 185 is actuated by means, preferably in the form of a trip device 186, Fig. 35, removably engaged on the conveyor chain 23 in advance of the mask and deposit applicator means 6. This trip device 186 preferably comprises an inverted U-section or grooved block 187 embodying a head portion 188 and spaced legs 189, 190, the former of which is longer than the latter. To the leg 190 is secured a spring finger 191 of appropriate contour and dimensions to engage between the conveyor inclined lugs 35 when the device 186 is seated in the undulate recess 34, of the carrier 33, as clearly understandable from Fig. 30a. The device 186 is placed on the conveyor chain 23 before the machine is started-up or previous to any disks 40 being fed and applied thereto, and it serves by engagement of a rounded corner 192 to shift a spring-influenced pusher-rod 193 for successive actuation of an appropriate switch 194 controlling the magnetic valve 185 of each unit 151, whereby pressure air and the desired resistance deposit are continuously sprayed against the mask 163 until the supply in the receptacle 177 is exhausted or the machine is stopped. It is to be observed the lower end of the exhaust conduit 171 is closed in at 195 to form a collection pocket for surplus resistance deposit settling therein, or not carried away to the discharge outlet 173; also that the boxes 160 are supplied with appropriate cleaning solution for removal of the resistance material, silver or carbon after the mask 163 passes actively in front of the opening 170, and that the brushes 161 rotate therein; whereas the revolving brushes 162 function to dry-clean said mask before progression over the opening 170. Flanking each side of the opening 170 is a rigidly mounted bracket 196 of Z-section, the upper flange 197 whereof affords guidance for stationary and movable pins 198, 199, respectively, to the latter of which are fixed a guide bar 200 with interposed springs 201, said bar having a longitudinal groove 202 for coaction with the conveyor chain carriers 33 in maintaining the latter vertical during impact of spray from the gun 175. Furthermore, the bar 200 serves to maintain the mask 163 in true parallelism with the conveyor carriers 33 and thereby positively ensures engagement of the progressing pins 41 with the mask apertures 164, at all times, during operation of the machine.

Referring to the spray gun 175, and in order to ensure an accurate concentric tubular flow from the nozzle 203, Figs. 19, 20 and 47, the conventional needle 204 is provided with a sleeve 205 of a force-fit diameter for engagement in the resistance medium conduit 206, and said sleeve is formed with longitudinal "flutings" or grooves 207, for normal flow passage to the tip 208. Thus it will be readily understood that by use of the sleeve 205 the needle 204 is firmly sustained axially relative to the tip 208, with the result a predetermined even tubular discharge can be accurately determined by longitudinal adjustment of said needle in accordance with prevailing practice, and without any remote possibility of the discharge becoming eccentric by axial misalignment of the needle tapering end 209 relative to the axis of the tip 208, while it is to be particularly noted said tapering end always projects outwardly beyond the tip orifice as clearly shown in Fig. 47. Furthermore, the air outlet ducts 210 in the nozzle horns 211 are diametrically opposed and inwardly angled, as clearly shown in Fig. 47, so as to flatten the tubular discharge of the fluent resistance deposit discharged by the tip 208, in a vertical direction, for correspondingly directed action against the inner face of the mask 163; or, in other words, at right angles to the path of progression of said mask.

Turning to Fig. 1, as well as Figs. 20, 23 and 27 more particularly, which illustrate the drying system 7, it will be seen the same comprises a longitudinal chamber 212 having a funnel-shaped inlet 213, with a tubular section 214 in which are located suitable heaters 215; said section connecting with an air conduit 216 from a rotary electric blower 217. In addition the chamber 212 is provided with a dome portion 218 above the inlet 213, and a series of flue outlets 219 communicating into the exhaust conduits 171, as well as "cowl" branches 220 having their outlets 221 in close proximity to the conveyor chain carriers 33, intermediate the flue outlets 219. Similarly the dome portion 218 has an elongated outlet 222 in registration with and lengthwise along the conveyor chain carriers 33 so as to thoroughly dry the resistance deposits on the rheostat disks 40.

Referring back to the trip device 186, and Figs. 31-34 more specifically, provision is made for removing said device in advance of the disk releasing and discharging means 8. In a preferred form, this provision includes a suitable bracket 223 rigidly mounted on the chain track 27, said bracket embodying a lateral inclined flange 224 with which the longer leg 187 of the device 186 engages and coacts to elevate the device 186 vertically, until released from engagement with the conveyor chain carrier 33 for a purpose hereinafter explained. The bracket 223 also embodies an inverted U-section guide portion 225 with which the trip device 186 initially engages as it approaches the inclined track 224 and is prevented from being knocked off the conveyor chain 23 when the leg 187 impacts the lower edge 226 of said track to release the finger 191 from engagement between the carrier inclined gripping lugs 35. In addition the bracket 223 is provided with a top flange 227 to which is firmly secured a permanent "horse-shoe" magnet 228 which, as the trip device 186 advances into its magnetic field, functions to attract and hold said device clear of further coaction with the conveyor chain 23. The device 186 may thereupon be removed and conveniently placed for re-use as hereinbefore set forth.

Referring now to the disk release and discharging means and conveyor carrier, as well as the chain cleaning mechanism hereinbefore generally designated 8 in Fig. 1, reference will now be made more particularly first to Figs. 2, 28 and 29. From the last mentioned figures, it will be observed the main drive shaft 11 carries a grooved pulley 229 which is operatively coordinated, by a crossed drive 230, with a corresponding pulley 231 on a short shaft 232, journaled in a suitable bearing 233 rigidly fixed to one of the machine framework supports 1. This shaft 232 carries a grooved drum 234, about which passes an endless conveyor 235 adapted to transport the released and treated rheostat disks 40 into a convenient baking oven, and not shown as it forms no part of this invention. An inclined chute 236 located at the discharge end of the conveyor 4 and supported by bracket means 237 serves to receive and guide the released disks 40 for proper deposit on the conveyor 235 with the coated side up. In order to free the disks 40 from the conveyor carriers 33, the transverse shaft 20 has fixed thereon a cam gear 238, with which coacts a small roller 239, revolubly supported by a lateral projection 240 from a fulcrum lever 241, pivoted at 242 to an angle bracket 243, in turn rigidly sustained by the shaft bearing 21. Pivoted at 244 to the free end of the fulcrum lever 241 is a link 245, in turn having pivot connection at 246 to one end of a "kicker" 247 fulcrumed by an appropriate bracket 248 to the support 1. The bracket 248 has an anchorage projection 249 to which one end of a recoil spring 250 is connected, and said spring has the other end engaged at 251 to the fulcrum lever 241 so as to hold the roller 239 in constant engagement with the cam gear 238, in an obvious manner. From Figs. 2, 28 and 29, it will be noted that as the roller 239 passes over the crest of the cam gear teeth that the levers 241 and 247 will be relatively moved in different angular relationship, also that a laterally projecting pin 252 on the latter coacts with the successive disks 40 on the conveyor carriers 33, as the latter travel the lower quarter-round path of progression of the conveyor 4 at the commencement of its return flight.

Suitably carried by one of the framework supports 1 is a container 253 of appropriate cleaning fluid 254 through which the return flight of the conveyor chain 23 and disk carriers 33 are progressed in order to remove therefrom any adhering resistance deposit, after the disks 40 have been removed as just previously explained. The container 253 is substantially closed-in and is provided with a trough-like extension 255 fitted with an upwardly active stationary brush 256 for brushing the carrier edges as they emerge from said trough extension. Freely rotative in spaced bearings 257 of the container walls 258 are pairs of confronting rotary brushes 259, between which the conveyor return flight and depending carriers 36 are advanced. The shafts 260 of the brushes 259 are respectively provided with grooved pulleys 261 and are operatively coordinated by a crossed belt 262; while one of the shafts 260 has fixed thereon a driver 263 around which passes an endless belt 264, in turn coacting with a larger diameter pulley 265 on the countershaft 15, hereinbefore referred to. In addition, one of the chain aligning angle brackets 28, and freely rotative sprockets 29, is located proximate the brush 256 so as to ensure proper cleaning coaction of the latter with the carrier edges. Spaced stationary brushes 266, Fig. 24, may also be provided in the trough 255 to aid in removing cleaning solution or fluid 254 from the carriers 33 after leaving the rotary brushes 259. In spaced relation to the outlet end of the trough 255 is preferably located a box like enclosure 267 through which the return flight of the conveyor chain 23 passes, said enclosure having a conduit connection 268 with a centrifugal electric blower 269 whereby pressure air acts on the returning carriers 33 to blow out, or away, any remaining particles of the resistance medium well before said carriers return back into position for application of fresh disks 40.

In Fig. 1 a main starting switch is indicated at 270 for setting the machine conveyor 4 in operation; and 271 indicates the switch controlling the means supplying pressure air to the nozzle 85 and spray guns 175; and it is to be understood said main switch 27 controls, by appropriate circuits, all of the motors 9, 180, and electrically actuated blowers 217 and 269, as well as energizing the various electro-magnetically operated valves 113 and 185. It is also to be noted the actuator lever 46 is provided with a hole 272 for registration with a corresponding aperture 273 in the connector wall 66 of the magazine and feed mechanism 5, see Figs. 1 and 7; so that when desired the pawling element 51 may be raised out of engagement with the tooth cam 53, by inserting a pin—not shown—into said hole 272 and aperture 273 when in registration, for a purpose later explained.

Referring also to the magazine and feed mechanism 5, the grooved spanning-wall 66 supporting the wear bars 68 and slide bars 74, said wall preferably seats at the sides in edge grooves 274, Figs. 6 and 11, in the spaced uprights 65, and it is provided at the lower portion with flanges 275 having extensions 276 slidable in grooves 277 in said spaced uprights 65. In addition, the flanges 275 have elongated slots 278 through which spaced clamp screws 279 engage correspondingly threaded holes in the uprights 65 whereby provision is made for adjustment of the plane of the wall 66, as well as the disk receiving and holder bar 82, into close proximity and true parallelism with the conveyor chain 23. This provision for adjustment of the holder bar 82 relative to the path of travel of the conveyor chain 23 is of prime importance, inasmuch as it enables prevention of flight "caroming" of the disks 40 from the inclined recess 84 in said bar under influence of the pressure air blast from the nozzle 85. Furthermore, in order to also prevent "pocketing" of air intermediate the disk 40 as it impacts the carrier 33 for engagement by the inclined lugs 35, said carrier is preferably provided with air escape holes 280 Fig. 11 therethrough, whereby any glancing action of the disk flight, in respect to the carrier 33 is effectively avoided. In other words, by the provisions just described, irregular impacts of the disks 40 against the carrier 33 is prevented, and failure of the disk 40 being automatically engaged by the lugs 35 rendered impossible.

The structural features of the invention, as well as the coordinative relationship of the several mechanisms having been explained, operation of the machine is briefly as follows. The operator first manually raises the outer end of the actuator lever 46, until the holes 272, 273 register, and then inserts a pin in said holes to hold the pawling element roller 52 out of engagement in respect to the tooth cam 53, whereupon the switch 270 is closed with resultant setting in motion of the motors 9 and, through the drive mechanism hereinbefore described, starts the endless conveyor 4. Concurrently the motors 180, as well as the centrifugal blowers 217 and 269 commence operating with the heaters 215 switched on; when the pressure air controlling switch 271 is also closed, and the necessary adjustments made so that the successive mask and resistance material depositing units 151 will make the required application of such material with consistent individual predetermined ohms resistance. The trip device 186 is now applied to the conveyor chain 23 at a point in advance of the first mask and deposit unit 151, so that the spray guns 175 will have been operating a short time before presentation of disks 40 therebefore for resistance deposit application, when the actuator lever 46 is released—by withdrawal of the hereinabove referred to pin from the holes 272, 273—so that the roller 52 of the pawling element 51 coacts with the tooth cam 53, whereby the disk feeding ejector plate 77 becomes intermittently activated to successively remove a rheostat disk 40 from the inclined chute 56 into the province of the air nozzle 85. It will now be readily understood that the intermittent blasts of pressure air emitted by the nozzle 85 alternate in timed relation with the disposal of the consecutively released disks 40, in front of the collapsed end 112 of said nozzle, so that the disk 40 is projected onto the registering carrier 33 for engagement by the inclined lugs 35, during the period of retraction of the ejector plate 77, and its positioning ready to release the next disk 40 from the chute 56. Immediately following the operation just described, incident to continuous progression of the conveyor chain 23 the carrier 33, with the applied disk 40, passes below the presser roller 138 which forces said disk into gripped relation by the inclined lugs 35 to prevent its oscillation to the right or left-hand, as hereinbefore explained. Continued progression of the conveyor 4 moves the consecutively applied disks 40 successively into the active zones of the several mask and deposit units 151, for application thereto of the resistance material by the respective spray guns 175. At this juncture and, as a typical example of the fluent resistance deposit applications which may be positively effected by the consecutive units 151, reading from right to left of Fig. 1 and Figs. 37–46 (sheet 1) for producing disks 40 embodying a one-hundred percent effective rotation, for instance in a clockwise direction. In this connection the first endless mask 163 is provided with an aligned succession of spaced curvilinearly-related differential "off" and "on" apertures $a$, $b$, Fig. 37, for application thereto of silver deposits $c$, $d$, Fig. 42, of two to four ohms resistance approximately or 10% of the effective rotation; the second mask 163 having a succession of spaced sectoral apertures $e$, Fig. 38, for applying a carbon deposit $f$, Fig. 43, in circumferential continuity with the deposit $d$ aforesaid, said deposit $f$ being of five thousand ohms resistance and advancing to approximately 33⅓ of the effective rotation; the third mask 163 has a sectoral aperture $g$, Fig. 39, for making a carbon deposit $h$ of ten thousand ohms resistance, Fig. 44, and advancing to 55% of the effective rotation; the fourth mask 163 having a follower sectoral aperture $i$, Fig. 40, for making a carbon deposit $j$ of forty-five thousand ohms resistance, Fig. 45, with an advance up to 93% effective rotation; and the fifth mask 163 being provided with final sectoral apertures $k$, Fig. 41, completing the circumferential carbon deposit $l$ of fifty thousand ohms resistance, Fig. 46, with a 100% effective rotation; or completing the annular carbon deposit up to the initial silver deposit $c$. Concurrent with the deposit applications $c$, $d$, $f$, $j$ and $l$, it is to be noted the conveyor chain 23 is traveling through the active sphere of the drying system 7 with the carriers confronting the conduit openings 170, cowl outlets 221, and dome elongate opening 222, whereby the moisture content of the respective resistance spray deposits is gradually evaporated with resultant progressive "drying-out" of said deposits. Also, incidental to the operations just described, the trip device 186 will have been advanced into the field of the permanent magnet 229 and released from, as well as freed of engagement with, the conveyor chain 23 and carrier 33 as hereinbefore set forth. After leaving the drying system 7 the conveyor 4 advances the treated disks 40 to the releasing mechanism 8 whereupon the "kicker" 247 removes the successively presented disks 40 from engagement with the carrier gripping lugs 35, for individual guidance by the inclined chute 236, with the treated face uppermost, for consecutive placement on the endless conveyor 235, and transfer thereby to a suitable bake oven.

From the foregoing the invention will be clearly understood and its advantages fully appreciated, while it is also self-evident that when the air pressure is properly gauged, the spray guns 175 adjusted as required, and the consistency of the deposit solvent in the respective receptacles 177 properly proportioned to the predetermined ohms resistance, that the machine may be run indefinitely, and that the discharged disks 40 will be automatically turned-out for final baking with positive assurance of equal and corresponding resistance capacity for each said disk.

While the foregoing description of the construction and operation of the resistance material desposit effecting machine, and the application of same to use, will be readily understood; also that a simple and efficient means is provided for carrying out the stated objects of the invention. Still further, although one practical embodiment of the invention has been particularly explained with elements and means preferably adapted to perform the functions set forth, for a specific purpose, it is obvious that various changes in form and other applications of the inventive features may be resorted to, without departing from the spirit or sacrificing any of the advantages of this invention.

Having thus described our invention, we claim:

1. Means for applying fluent-differential deposits to specific areas of corresponding articles comprising in combination, a progressing mechanism, a container of the articles with means for individually feeding them to the progressing mechanism, means for translating each consecutive article from the container onto the progressing mechanism for carriage thereby, means in the path of the progressing mechanism for securing the translated articles thereon, spray devices confronting the secured articles, a mask associated with each spray device having apertures controlling the deposit applications made by said device on the article, means for drying the deposits applied to the articles, means for subsequently releasing the dried articles from the progressing mechanism, and means for actuating all of the respective devices in timed relation.

2. The combination of claim 1 further characterized by means for cleaning the mask subsequent to the deposit applications, and means for similarly cleansing the progressing mechanism after removal of the treated articles.

3. Means for applying fluent differential deposits to determinate areas of like articles comprising in combination, a continuous progressing mechanism, a container of the articles with means for individually feeding them into a temporary stop location facing the progressing mechanism, means effective to project the articles from the stop location onto the progressing mechanism for transportation thereby, means in the path of the progressing mechanism for holding the projected articles thereon, a series of spray devices confronting the held articles, each said device having an associated apertured mask controlling the deposit application, a heating system for gradually drying the deposits applied to the articles, means for individually removing the dried articles from the progressing mechanism, and mechanism for actuating all of said devices in timed relation.

4. The combination of claim 3 further characterized by the progressing mechanism including means for actuating the mask, means operative to clean the masks subsequent to each deposit application, and means for cleansing the progressing mechanism after removal of the treated articles.

5. A machine for sequential application of fluent differential deposits in continuity to determinate areas of corresponding articles comprising in combination, an endless conveyor, a magazine with means for ejecting and feeding individual articles therefrom to a temporary arrestor facing the active flight of the conveyor, means effective to project the articles from the arrestor onto the conveyor for progression thereby, means in the path of the conveyor operative to move the articles into engagement with grip elements on said conveyor, a series of spray guns confronting the gripped articles and each having an associated continuous mask with deposit-defining apertures therethrough, means for gradually drying the articles concurrent with and after the deposit applications, means for removing the articles from the conveyor with the treated face upwards, and mechanism for actuating the several devices in timed relation.

6. A machine as defined in claim 5 including means operatively coordinating the continuous masks and endless conveyor for synchronous actuation, brushes coacting with the mask for cleaning and drying the mask after each deposit application, and means for cleansing the conveyor during its return flight.

7. A machine for application of fluent differential deposits to flat elements in relative continuity comprising in combination, an endless conveyor with spaced carriers, a magazine with an ejector for removing and feeding the individual elements therefrom to a temporary holder facing the conveyor carriers, a device effective to translate the flat elements from the temporary holder into coaction with retainer projections on the respective carriers, means in the path of the conveyor active flight operative to impart sliding movement to the flat elements for grip engagement by the carrier projections, a series of spray guns supplied with fluent deposit medium confronting the conveyor carriers, each said gun having an associated endless mask with aligned deposit-defining apertures therethrough, a heating system along the conveyor active flight and the spray guns for gradually drying the treated flat elements during and after the deposit applications, intermittently actuated means for consecutive removal of the flat elements from the conveyor subsequent to leaving the drying system with the treated face upwards, and mechanism for actuating the said devices in timed relation.

8. A machine as defined in claim 7 including pins projecting from the conveyor carriers engageable in registrable holes in the respective masks for synchronous movement of the latter with progression of said conveyor, rotary brushes coacting with both faces of the respective masks for removing deposit medium adhering thereto and dry cleaning said masks after each deposit application to the flat elements, and brushes coacting with the return flight of the conveyor for cleansing the latter.

9. A machine for applying fluent deposits of differential ohms resistance to rheostat disks in annular continuity comprising in combination, an endless conveyor including spaced carriers, a magazine with an ejector operative to individually remove disks therefrom, a holder into which the successive disks are deposited and temporarily held, pneumatic means effective to project each deposited disk from the holder into coaction with projections from the registering conveyor carrier, pusher means in the path of the conveyor active flight operative to force the disk into retentive engagement by the carrier projections, a series of spray guns supplied with fluent differential resistance media paralleling the conveyor carriers, each said gun having an associated endless mask with aligned deposit-defining apertures therethrough, a drier paralleling the conveyor active flight with outlets facing the carriers and masks for progressively evaporating moisture from the applied deposits, intermittently actuated means for releasing the disks from the carriers subsequent to the drying operation and depositing them, treated face upwards, on an appropriate transporting means, and mechanism for actuating the several devices in timed relation.

10. A machine for applying deposits in accordance with claim 9, further characterized by individual rotary means effective to clean and dry the respective endless masks after each deposit application, and other rotary and stationary means for similarly cleaning the conveyor chain and carriers during its return flight.

11. A machine as defined in claim 9 further including means effective to guide the active flight of the conveyor along a definite path of travel, and associated means effective to prevent the disk carrier being deflected during impact of the pneumatic and deposit spray jets.

12. A machine as defined in claim 9 in which the disk receiving and temporary holder is characterized by flanking flexible elements functional to hold the disks against the conveyor carriers until firmly gripped by the carrier projections.

13. A machine as defined in claim 9 further characterized by a removable trip device applicable to the conveyor in advance of the series of spray guns for setting the latter in operation, and mechanism including a permanent magnet for removing the trip device from the conveyor before said conveyor commences its return flight.

14. A machine as defined in claim 9 in which the temporary holder embodies a recess inclined over from the vertical, and a flanking spring serves to hold a disk deposited on said means against rotary movement.

15. A machine for applying fluent differential resistance-deposits to rheostat disks in annular sequence comprising in combination, means supporting an endless link chain conveyor for continuous progression, said conveyor including elements for carrying the disks in vertical position, and said elements having recessed upper edges; means confining the active flight of the conveyor to a direct path of progression; means effective to maintain the return flight of the conveyor in alignment; a container of the disks with means urging them toward an outlet orifice, a sustaining means for the disks, a device for ejecting the disks individually through the container outlet and depositing them in an adjacent holder, means effective to operate said device with progression of the conveyor, and the holder embodying a recess for temporary reception of each ejected disk; means to prevent vibratory displacement of the disk from the holder recess; an air pressure means with a nozzle in juxtaposition to the disk holder effective to project the disk therefrom into coaction with lateral projections on the registering carrier element; a thrust device, in the path of the conveyor active flight, actuated by the consecutive carrier elements, to push the disks received by said elements into grippage by the lateral projections therefrom; a series of spray gun units for depositing fluent resistance media of differential density on the carried disks, said spray guns having individual agitator means for maintaining the respective resistance media consistent in character; means regulating constant air pressure supply to the spray guns; a movable mask with aligned deposit-defining apertures associated with each spray gun, rotary and stationary means for guidance of the mask in parallelism to and for effecting synchronous actuation of said mask by the conveyor; cooperative cleaning and drying means associated with each mask; a drying system along the conveyor active flight with outlets intermediate the spray nozzles and masks; buffer means constraining the disk carrying elements from inclination during the impacts caused by the disk ejector and spray guns; intermittently actuated rocker mechanism effective to remove each deposit-treated disk from the successive carrier elements during the initial portion of the conveyor return flight; means for depositing the removed disk, treated face up, on an appropriate transporting means; means including movable and stationary devices with an associated blower jointly serving to clean the disk transporting elements after removal of the treated disks; and mechanism for actuating all of the devices aforesaid concurrently in timed relation.

16. A machine as defined in claim 15 wherein the thrust device, for forcing the disks into grip engagement by the conveyor carrier lateral projections, comprises a fixed bracket with vertical guideways, a slide in said guideways with a roller rotative therebelow for coaction with the conveyor carrier recessed upper edges, an anchorage spans the guideway lower portions, a vertically adjustable member projects upwardly from the top of the slide with a lateral coupler element, a fixed guide rod passes freely through a hole in the adjustable member to confine the latter to vertical movement, and a tension spring is intermediate the anchorage and coupler elements to normally influence the slide downwards.

17. A machine as defined in claim 15 further characterized by a removable trip device, applicable to a selected disc carrying element, said device consisting of an inverted U-formation member with one leg longer than the other and one vertical edge of said leg being rounded, a downwardly-tapering spring finger secured to the inner face of the U-formation member and projecting below the longer leg; and a push-in actuator, movable by the trip device rounded edge, for initiating operation of the spray guns successively.

18. A machine as defined in claim 15 further characterized by a removable trip device applicable to a selected disk carrying element for initiating operation of the spray guns, and means for releasing and holding said device out of engagement with the conveyor carriers, such means comprising a stationary bracket with a lateral upwardly-inclined flange adjoining the path of the active flight of the conveyor, said bracket also embodying an inverted U-section guide portion for coaction with the trip device before release of the latter by the bracket inclined flange, an opposedly-directed horizontal-flange on the stationary bracket planarly slightly above the top edge of the conveyor disk carrier elements, and a permanent magnet seated on and secured to said horizontal-flange for attraction and retention of the released trip device clear of further engagement with the conveyor.

19. A machine as defined in claim 15 wherein the movable mask is of strip formation and has drive apertures with a succession of spacedly aligned deposit-defining holes therein, a rotary and plural stationary means confine the mask to a vertical path of travel, said stationary means sustaining a length of the mask in close parallelism to the conveyor disk carrying elements with the progressing pins on the latter engaging in the mask drive apertures to effect its synchronous progression with the conveyor.

20. A machine as defined in claim 15 wherein the movable mask is in the form of an endless band, said mask having parallel lines of regularly spaced drive apertures with an intervening succession of spacedly-aligned deposit-defining holes therein; a spool freely-rotative about a stationary vertical axis remote from the conveyor and stationary arcual guards jointly confine the mask to a vertical path of progression with that portion intervening the arcual guards in close proximity to the conveyor disk carrying elements, and the laterally projecting pins of said elements engage through the mask drive apertures to effect its progression synchronously with the conveyor.

21. A machine as defined in claim 15 wherein each spray gun has an attached receptacle for solvent of predetermined ohms resistance, an agitator in said receptacle driven by an individually connected motor for maintaining the solvent at a constant fluency, a sleeve fitted in the spray gun solvent conduit, said sleeve having a bore for axial maintenance of the spray adjusting needle against misalignment relative to the tip orifice of the gun, and circumferentially-spaced longitudinal grooves exterior of the sleeve for flow of the solvent through the nozzle of the gun to its tip whereby an accurately defined annular spray discharge is constantly maintained.

22. A machine as defined in claim 15 wherein each spray gun nozzle tip is provided with diametrically-opposed inwardly-directed horns, the needle tapering end is axially extended to project outwardly beyond the tip orifice, and an angular discharge duct is provided through each said horn in communication with the pressure air supply, whereby the tubular spray discharge from the nozzle is vertically collapsed.

23. A machine as defined in claim 15 wherein the pressure air supply conduit to each spray gun includes a magnetic valve with an associated pressure regulator, a removable means carried by the conveyor operates a switch to effect opening of said valve, and a recoil pusher device closes said switch incidental to progression of the conveyor for maintenance of a constant air pressure supply to the spray gun.

24. A machine as defined in claim 15 wherein the mask cooperative cleaning and drying means comprise, a receptacle of suitable cleansing liquid through which the mask progresses, a pair of rotary brushes fast on a short transverse shaft, which engage both faces of the mask, rotatable in bearings across the receptacle, an opposing axially aligned other pair of exposed rotary brushes similarly coacting with another portion of the mask to dry-clean the latter, and means operatively coordinating said devices to the main drive shaft of the machine for concurrent operation.

25. A machine as defined in claim 15 wherein the buffer means resisting the impact of the spray guns also serves to positively register the conveyor mask progressing pins in the drive apertures of said mask, and comprises a rigidly mounted Z-section bracket, holes in the upper flange of said bracket afford guidance for stationary and movable pins, a guide bar sustained by the movable pins, said bar being of a length to overlie a succession of the conveyor carrier elements with a longitudinal groove engaging the upper edges and backs thereof to resist vertical deflection during the constant spray impact, springs intervening the guide bar and the underside of the Z-bracket upper flange, and the stationary pins being rigidly secured to said upper flange with free passage through complemental holes in the guide bar.

26. A machine as defined in claim 15 wherein the drying chamber comprises a longitudinal chamber having a funnel-shaped inlet with a tubular section, heaters in the tubular section, a centrifugal blower in conduit connection with said tubular section, spaced flues from the drying chamber registering with the respective spray guns and through which the individually associated masks progress, a flow conduit from each flue in connection with a common manifold, cowl branches from the drying chamber intermediate the flues aforesaid with their outlets in proximity to the conveyor disk carriers, and a dome portion above the chamber funnel-shaped inlet with an elongated outlet in similar proximity to the disk carriers to effect thorough drying of the deposit applications to the disks by evaporation of the moisture content.

27. A machine as defined in claim 15 wherein the disk releasing and discharging means comprises a toothed cam fast on the driving shaft of the conveyor, a spring influenced lever fulcrumed at one end to a stationary bracket mounted on the machine frame, a lateral projection from the fulcrum lever having a roller coactive with the toothed cam, a link pivoted to the other end of the fulcrum lever in turn similarly connected at its opposed end to a kicker member, a rigid fulcrum for the kicker projecting from the machine framework, and said kicker member having a laterally-projecting pin for coaction with the circumferential edge of the consecutive disks to release them from gripped engagement by the conveyor carrier projecting lugs.

28. A machine as defined in claim 15 wherein the conveyor cleaning means comprises, a container for appropriate cleaning liquid with inlet and outlet openings through which the conveyor passes above the level of said liquid during its return flight after release of the deposit treated disks therefrom, a trough-like extension at the outlet end of said container, opposingly-active rotary brushes journaled transversely of the container with means for rotating them reversely, said brushes being partially immersed in the cleaning liquid and coactive with both faces of the conveyor carrier elements, stationary brushes in the trough-like extension for brushing of the cleaning liquid after the carrier elements leave the container, and an associated atmospheric air ejector means for removing any adhering particles of the resistance deposit, said ejector means being in the form of an enclosure in the path of, and through which, the conveyor passes after leaving the trough-like extension aforesaid.

CHARLES C. SCHAEFER.
SOREN A. TOLLEFSON.
HERMAN F. NIED.